United States Patent [19]

Linss et al.

[11] Patent Number: 4,806,092
[45] Date of Patent: Feb. 21, 1989

[54] APPARATUS FOR MANUFACTURING A PLASTIC HOLLOW BODY OPEN ON ONE END AND CLOSED ON THE OTHER

[75] Inventors: Gerhard Linss; Karl-Friedrich Ossberger, both of Weissenburg, Fed. Rep. of Germany

[73] Assignee: Ossberger Turbinenfabrik GmbH & Co., Weissenburg, Fed. Rep. of Germany

[21] Appl. No.: 154,590

[22] Filed: Feb. 10, 1988

[30] Foreign Application Priority Data

Feb. 12, 1987 [DE] Fed. Rep. of Germany ....... 3704264

[51] Int. Cl.$^4$ ............................................. B29C 49/06
[52] U.S. Cl. .................................... 425/529; 215/1 C; 264/537; 425/527; 425/533
[58] Field of Search .................... 428/35, 36; 215/1 C; 425/503, 522, 528, 529, 532, 533, 566, 466, 527; 264/537, 539

[56] References Cited

U.S. PATENT DOCUMENTS

| | | | |
|---|---|---|---|
| 2,936,481 | 5/1960 | Wilkalis et al. | 425/529 X |
| 3,329,996 | 7/1967 | Marcus et al. | 264/539 X |
| 3,394,209 | 7/1968 | Cheney | 425/525 X |
| 3,740,180 | 6/1973 | Sidur | 425/533 |
| 3,791,098 | 2/1974 | Webster | 425/529 X |
| 4,097,214 | 6/1978 | Hsu | 425/532 X |

FOREIGN PATENT DOCUMENTS 2426736 12/1975 Fed. Rep. of Germany ...... 264/539
2528029 1/1977 Fed. Rep. of Germany ...... 264/539

Primary Examiner—Richard L. Chiesa
Attorney, Agent, or Firm—Holman & Stern

[57] ABSTRACT

In an apparatus for manufacturing a plastic hollow body which hollow body is open on one end and closed on the other, for the forming of a head piece a withdrawal device rests on a ring-shaped nozzle having a ring-shaped nozzle having a ring-shaped nozzle opening, and for the forming of a plastic tubular segment the bottom elements of blow-mold pieces rest on the ring-shaped nozzle, to provide for blow-molding of the tubular segment by blow means.

It is desired to be able to produce a hollow body with a closed head piece and a perforated bottom member. This is achieved in that the withdrawal device is configured for forming a head piece which is closed to the exterior; in that the bottom elements of the blow mold which rest on the ring-shaped nozzle forms a perforation in the bottom member of the body part of the hollow body, which perforation extends over the region surrounded by the ring-shaped nozzle opening; and in that the blow means disposed in the ring-shaped nozzle is associated with or "operative through" the perforation in the bottom member of the body part of the hollow body. Thereby, a hollow body can be manufactured which has a closed head piece and is fillable via the open bottom member.

9 Claims, 5 Drawing Sheets

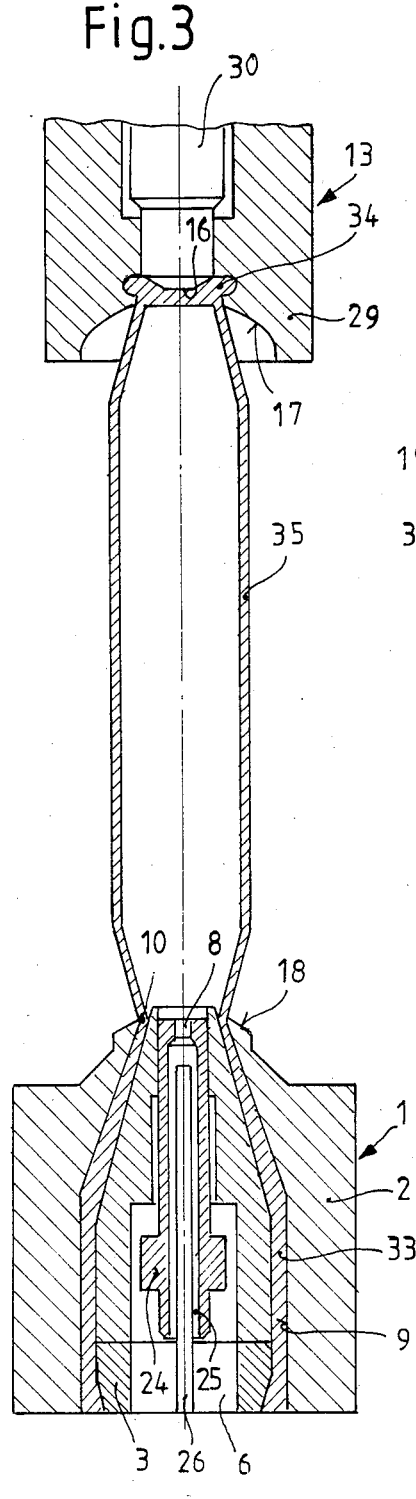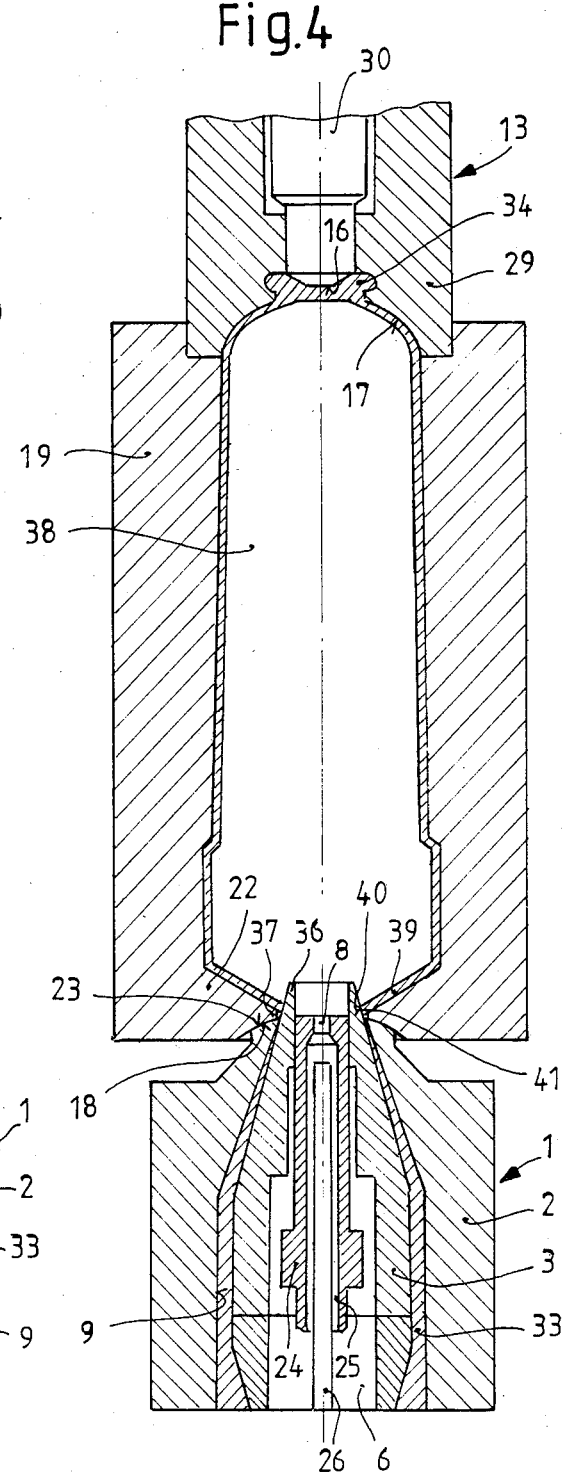

Fig. 8
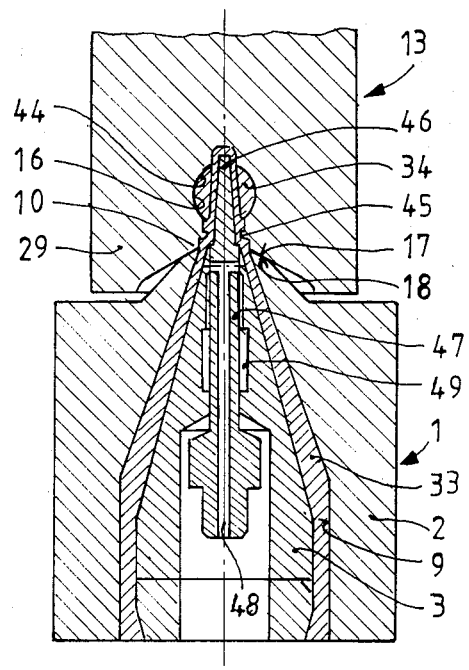
Fig. 10
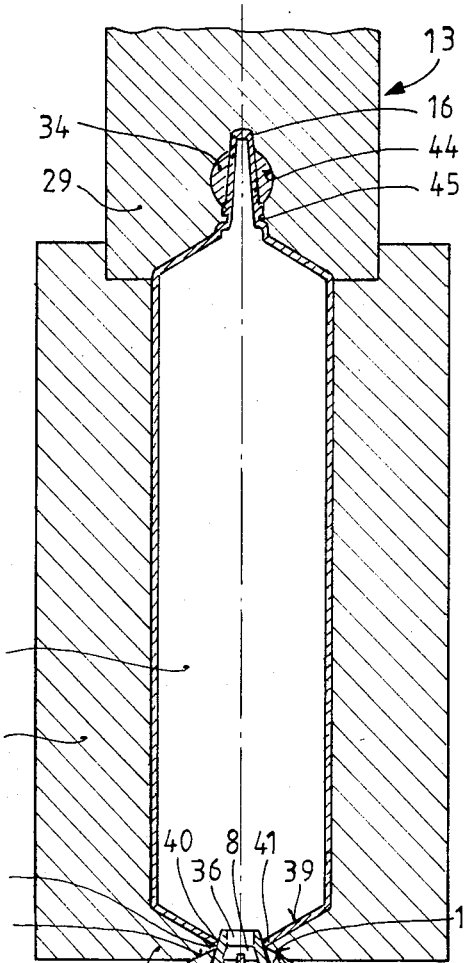
Fig. 9
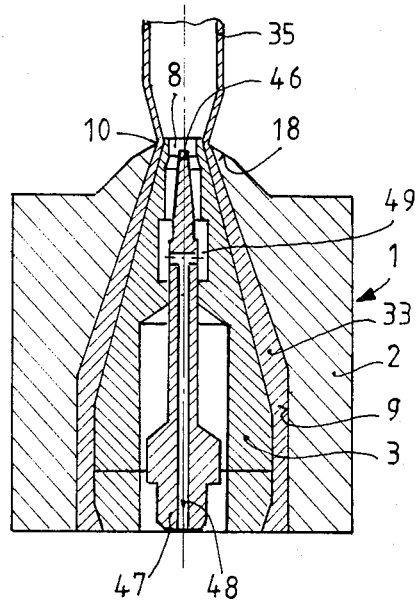
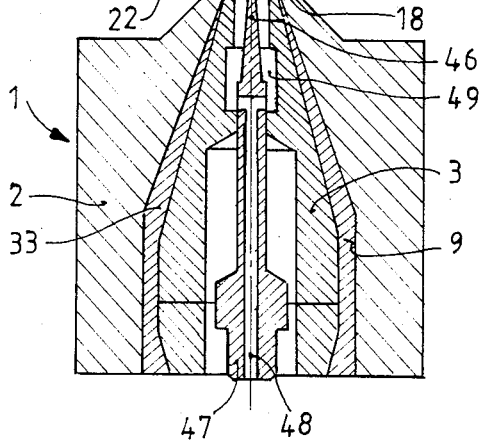

APPARATUS FOR MANUFACTURING A PLASTIC HOLLOW BODY OPEN ON ONE END AND CLOSED ON THE OTHER

BACKGROUND OF THE INVENTION

The invention relates to an apparatus for manufacturing a hollow body comprised of thermoplastic plastic material, which hollow body is open on one end and closed on the other, has a head piece fabricated by injection molding, has a body part comprised of a tubular segment integrally joined to said head piece, and has a bottom member, wherewith the subject apparatus is comprised of a ring-shaped nozzle wherein a nozzle cone piece and a nozzle piece define a ring-shaped nozzle opening, which opening can be closed (with severance of the plastic), said apparatus being further comprised of a withdrawal device with a recess for the head piece, which withdrawal device is axially reciprocally movable with respect to the ring-shaped nozzle, said apparatus further comprised of a blow mold having a plurality of blow-mold pieces which are laterally reciprocally movable, said apparatus further comprised of bottom elements of the blow-mold pieces, disposed at the altitude of the ring-shaped nozzle, which bottom elements rest on the ring-shaped nozzle when the blow-mold pieces are in the assembled position, and said apparatus comprised of blow means for blowing air into the tubular segment.

In a known apparatus of this type (Ger. Pat. No. 2,528,029), the withdrawal device is provided with a mandrel for producing a hole in the head piece (which is in the form of a tubular mouth piece), the bottom elements which rest on the ring-shaped nozzle have extensions which when pressed together seal the bottom of the body part, and the blow means are disposed in the withdrawal device in association with the hole in the head piece. A disadvantage of this known apparatus is that is cannot produce a hollow body having a closed head piece and a bottom member which is penetrated. Another known apparatus (U.S. Pat. No. 3,394,209) is also incapable of producing such a hollow body. In the latter apparatus, the bottom elements of the blow-mold pieces rest on a mold plate disposed ahead of the ring-shaped nozzle and said elements leave free the region through which the tubular segment passes; and the blow means disposed in the ring-shaped nozzle is associated with a hole in a head piece disposed in the mold plate.

SUMMARY OF THE INVENTION

Accordingly, it is an object of the invention to devise an apparatus of the type described initially supra, whereby a hollow body with a closed head piece and a perforated bottom member can be manufactured. This object is achieved by the inventive apparatus, which is characterized in that the withdrawal device is configured for forming a head piece which is closed to the exterior; in that the bottom elements (of the blow mold) which rest on the ring-shaped nozzle leave a perforation in the bottom of the body part, which perforation extends over the region surrounded by the ring-shaped nozzle opening; and in that the blow means disposed in the ring-shaped nozzle is associated with the perforation in the bottom of the body part.

In the inventive apparatus the perforated bottom is produced at the ring-shaped nozzle, and the perforation is used for introduction of the blowing air; accordingly, by definition the bottom of the hollow body does not have a head piece. As a rule, the blow means disposed in the ring-shaped nozzle does not project out of the ring-shaped nozzle, and does not take part in the forming (molding) of a head piece. A hollow body with a closed head piece can be manufactured which hollow body is fillable through the open bottom. There are many options for the closed head piece.

It is particularly advantageous if the apparatus is fitted with a device for cutting off an edge strip on the bottom of the hollow body, surrounding the perforation. The entire bottom member or a part of it is cut away, in order to obtain an accurately formed piece. Also, the flash edge at the middle of the bottom member is often inacceptably rough; this is advantageously corrected by subsequent cutting as proposed.

The inventive apparatus produces a novel type of hollow body in a novel fashion. The head piece which is injection molded over the ring-shaped nozzle, in the recess in the withdrawal device, has no opening between interior and exterior. After the withdrawal, i.e., the forming of the tubular segment, the bottom elements of the blow mold are moved together only to the extent that the end region of the tubular segment of the plastic preform which is disposed near the ring-shaped nozzle is compressively held against the ring-shaped nozzle, preparatory to the blowing (blow molding). With the tubular segment thus held, the blowing air is introduced through the bottom opening.

It is possible to provide a continuously open blow opening in the cone piece, wherewith materials which might soil the blow opening, which materials are present from the injection molding of the head piece, are removed by the blowing. It is particularly advantageous, however, if, when the withdrawal device rests on he ring-shaped nozzle, a blow opening in the cone piece, which opening is part of the blow means, is closed off by a reciprocally movable rod in said cone piece. In this way, plastic is prevented from entering the blow opening, and the attendant interference with operation is prevented, as well as contamination of the interior of the manufactured hollow body with spurious materials collected in or on and then blown off of the blow means.

It is further possible to carry out the severance of the plastic in the nozzle opening by a cutting cylinder which is reciprocally movable in the cone piece. It is particularly advantageous if the bottom elements of the blow mold, when resting on the ring-shaped nozzle, press the edge region bordering the perforation in the bottom of the hollow body against an end member of the nozzle cone piece which has been extended out of the nozzle piece. In this way, the axial stroke of the cone piece not only serves to sever the subsequently fed plastic, but also to help hold the tubular segment of the hollow body in place for blowing (blow molding).

It is particularly advantageous if, e.g., an axially reciprocally slidable elongated sliding piece has a molding extension which extends into the recess of the withdrawal device when the withdrawal device rests on the ring-shaped nozzle, wherewith the extension is itself elongated and thin, and said extension together with the said recess bounds a space for molding a nipple-shaped head piece. The type of nipple envisioned is, e.g., that for a hollow body which is a dispensing container for adhesive, wherewith the nipple is partially or completely excised by way of opening the completed container which has been filled with the adhesive.

It is further particularly advantageous if the nipple-shaped space has a region of reduced cross section e.g., reduced wall thickness extending around its circumference, near the end of the recess. This facilitates the abovementioned excision, or enables the nipple to be opened by tearing.

It is also particularly advantageous if the recess on the withdrawal device has a cylinder-shaped radially outer space on its side directed away from the ring-shaped nozzle (i.e. in its upper region), and on its side facing the ring-shaped nozzle (its lower side) has a disc-shaped space. This configuration yields a head piece with a transverse membrane, as in practice is produced only in situations with closed head pieces, and can now be produced (according to the invention) from plastic material, with the type of apparatus envisioned.

It is particularly advantageous also if the boundary of the recess of the withdrawal device on the side directed toward the ring-shaped nozzle is defined by an axially reciprocally movable elongated sliding piece, wherewith when the withdrawal device is resting on the ring-shaped nozzle the said sliding piece can be slid against the withdrawal device after the initial injection molding of the head piece, so as to press the plastic material of the head piece, e.g. after injection molding and after the plastic has partially cooled. In this way, the closed transverse (lower) wall of the head piece can be made much thinner than is possible by injection molding alone.

The thus produced thin transverse plastic wall (or membrane) which is easily broken (or penetrated) is protected against accidental damage by the cylindrical wall adjoining it. Also, the elongated sliding piece bearing the projecting extension as mentioned supra, which extension extends into the recess in the withdrawal device, can be adjusted to provide sufficiently large cross sections for successful injection molding, and thereafter can be advanced (upward) to press the partially cooled plastic mass, whereby at least in some regions very thin walls may be fabricated in the head piece. This is particularly useful for producing a reduced wall thickness in the tear-away region of the nipple.

It is also possible to fabricate the head piece as a disposable (dead) piece, employed solely to support the withdrawing of the elongated hollow body. Alternatively, the "head piece" may be employed as merely the base of a container which is open on "top". With an apparatus according to the invention, a wide variety of head pieces may be fabricated, provided that the head piece be capable of fulfilling the support function in withdrawing and that it be able to withstand the blowing (blow molding) without failure.

Preferred embodiments of the invention are illustrated in the drawings.

BRIEF DESCRIPTION OF THE DRAWINGS

FIG. 3 shows the apparatus of FIG. 2, in a second operating position;

FIG. 4 shows the apparatus of FIG. 2, in a third operating position;

FIG. 8 is a vertical cross sectional view of essential parts of a fourth inventive apparatus for manufacturing a hollow body comprised of thermoplastic plastic material, which hollow body is open on one end and closed on the other, said apparatus being in a first operating position;

FIG. 9 shows the apparatus of FIG. 8, in a second operating position;

FIG. 10 shows the apparatus of FIG. 8, in a third operating position; and

DESCRIPTION OF THE INVENTION

Figure 1:
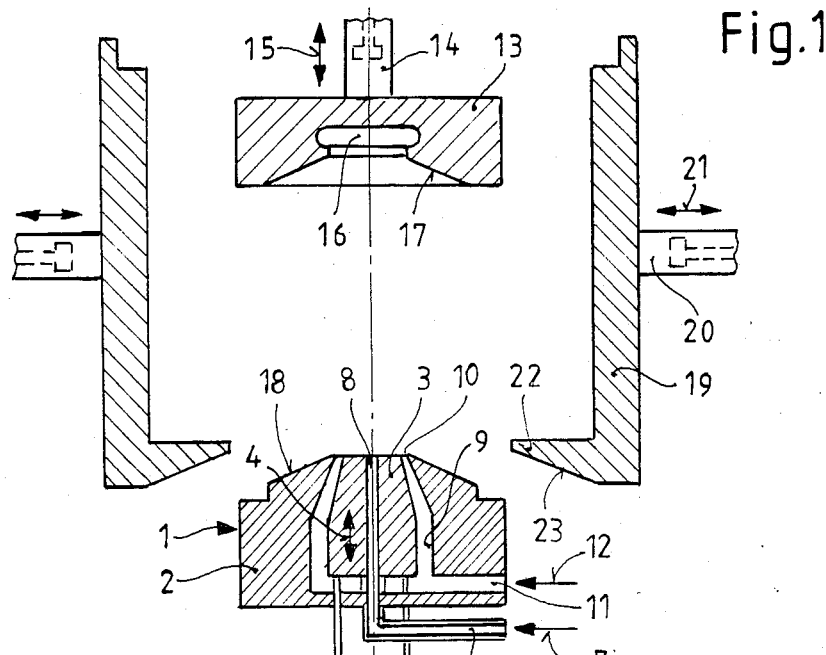
FIG. 1 is a schematic vertical cross section of an inventive apparatus for manufacturing a hollow body comprised of thermoplastic plastic material, which hollow body is open on one end and closed on the other.

The apparatus according to FIG. 1 comprises a ring-shaped nozzle 1 which is comprised of a fixed nozzle piece 2 in which a nozzle cone piece 3 is reciprocally movable (arrows 4) by a piston and cylinder device 5. Compressed air is supplied to the cone piece 3 via a tube 6 (arrow 7); this air is expelled from the cone piece 3 at the top, through a centrally disposed blow opening 8. The cone piece 3 and nozzle piece 2 define between them a ring-shaped channel 9 the upper end of which is a ring-shaped nozzle opening 10. Thermoplastic plastic material is fed to channel 9 from below via a tube 11 (arrow 12). Near the nozzle opening 10, the cone angle of the cone piece 3 is smaller than the cone angle of the inner surface of the nozzle piece, wherewith the nozzle opening 10 is closed off if the cone piece 3 is advanced upward.

A withdrawal device 13 is provided above the ring-shaped nozzle 1, which device 13 is reciprocally movable (arrows 15) by a piston and cylinder device 14. The underside of device 13 has a recess 16 which is laterally separable and reassemblable via an undercut and/or form-interlocking configuration (not illustrated). The withdrawal device 13 has a radially obliquely inclined support surface 17 which has a ring shape when viewed axially. The nozzle piece 2 has a matching end face 18 to the surface 17.

On both lateral sides of the ring-shaped nozzle 1 and withdrawal device 13 a blow-mold piece (19, 19) of a two-piece blow mold is provided. The pieces 19 are each reciprocally movable (arrows 21) by a respective piston and cylinder device 20. Each blow-mold piece 19 has a bottom element 22 having an inclined support surface 23 which can rest on the end surface 18 of the nozzle piece 2.

Figure 2:
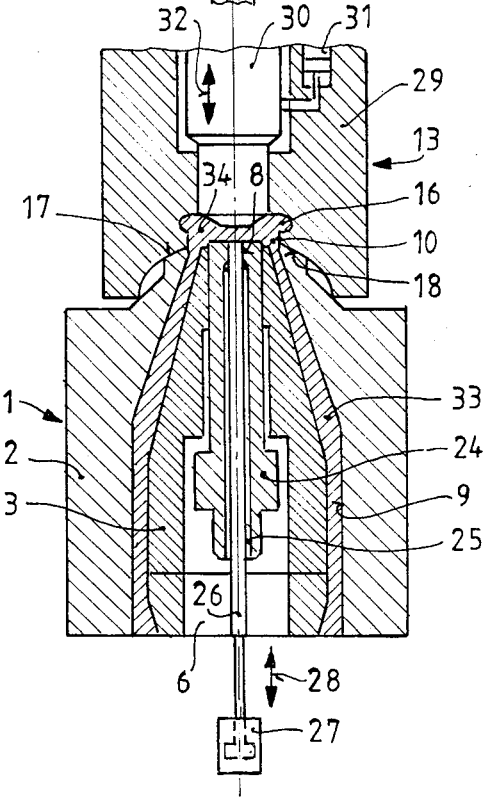
FIG. 2 is a vertical cross sectional view of essential parts of a second inventive apparatus for manufacturing a hollow body comprised of thermoplastic plastic material, which hollow body is open on one end and closed on the other, said apparatus being in a first operating position.

The apparatus of FIGS. 2-4 has a largely similar structure to that of FIG. 1; accordingly the same reference numerals are used. According to FIG. 2, the withdrawal device 13 rests on the nozzle piece 2. The support surface 17 and matching seat surface 18 have a configuration which slopes away from the withdrawal direction. The nozzle opening 10 is completely open, to allow plastic material to be injected; the upper end of the cone piece 3 is flush with the upper end of the nozzle piece 2. An elongated sliding piece 24 is disposed centrally into the cone piece 3, which sliding piece 24 is reciprocally slidable with respect to the nozzle piece 2 by means of a piston and cylinder device (not shown). Cone piece 3 can be slid along the piece 24. Sliding piece 24 has a bore 25 one end of which is connected to the blow air tube 6 and the other end of which forms the blow opening 8 the diameter of which is less than the bore 25. The end of a rod 26 extends into the blow opening 8, so as to shut off said opening, and rod 26 extends through bore 25 and into tube 6. Rod 26 is reciprocally movable (arrows 28) by a piston and cylinder device 27.

The recess 16 has a knob-like shape (FIG. 2), with a ring-shaped bead member which projects laterally. The recess 16 is formed in a mold block 29 of the withdrawal device 13. The boundary of recess 16 in the withdrawal direction (i.e., the top of recess 16) is formed by the end face of a plunger 30 which is reciprocally movable (arrows 32) with respect to the block 29 by a piston and cylinder device 31, for the purpose of ejecting the molded head piece from the mold. Plunger 30 extends into the recess 16, and the dimension of the recess in the withdrawal direction (here, vertical direction) may be varied by moving the plunger.

According to FIG. 2, thermoplastic plastic material 33 is injected into the recess 16 to produce a head piece 34. During this time, the nozzle opening 10 is fully open and the blow opening 8 is closed. Then the blow opening 8 is opened by retracting the rod 26, and the ring width of the nozzle opening 10 is slightly narrowed by advancing the cone piece 3 (upward). In this position (FIG. 3), a tubular segment is stretched i.e., extruded and stretched, by moving the withdrawal device 13 away from the ring-shaped nozzle 1. The lateral dimension of the tubular segment is also increased, by the blow air introduced. According to FIG. 4, the blow-mold pieces 19 are moved up to the nozzle piece 2 and the withdrawal device 13, to form the blow mold. The cone piece is fully advanced (upward), whereby the nozzle opening 10 is closed off, and an end portion 36 of the cone piece projects (upward) out of the ring-shaped nozzle 1. The edges 37 of the bottom elements 22 press and hold the tubular segment 35 against the end portion 36. The tubular segment is blown (blow-molded), yielding the body part 38 of a hollow body, with a bottom member 39 on its end directed away from the head piece 34. A perforation 40 is present in member 39, which perforation is bounded by an irregular edge (flash edge) 41.

Figure 6:
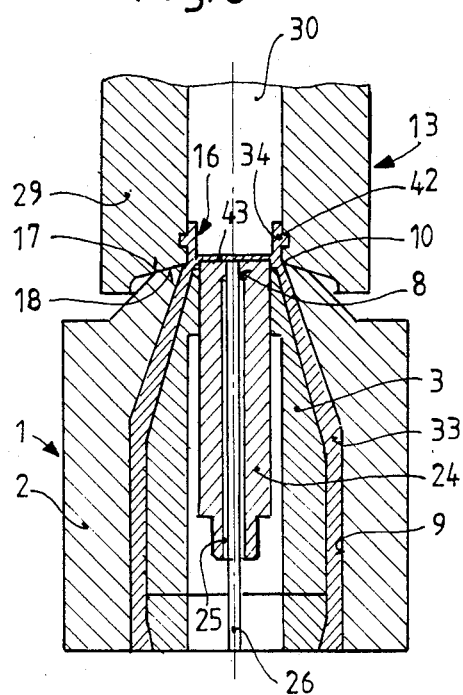
FIG. 6 shows the apparatus of FIG. 5, in a second operating position.
Figure 7:
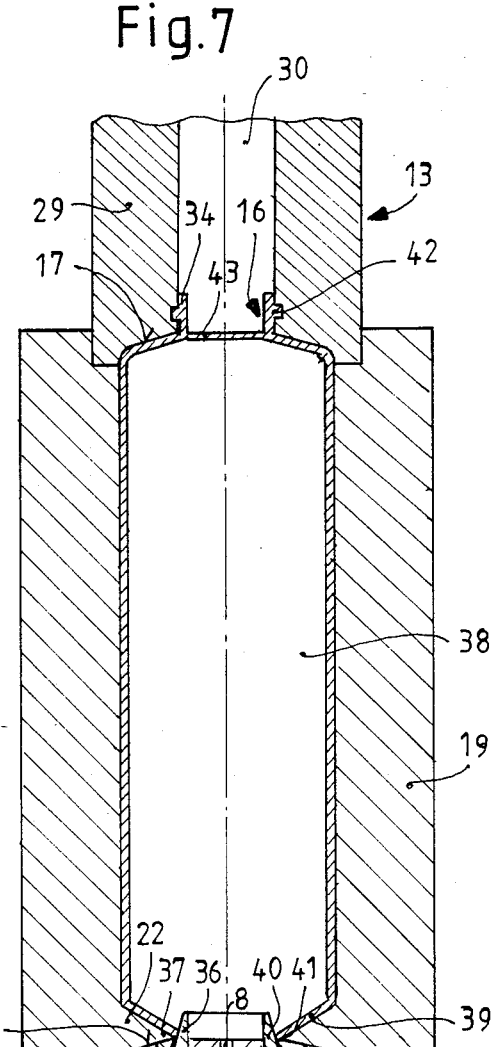
FIG. 7 shows the apparatus of FIG. 5, in a third operating position.
Figure 5:
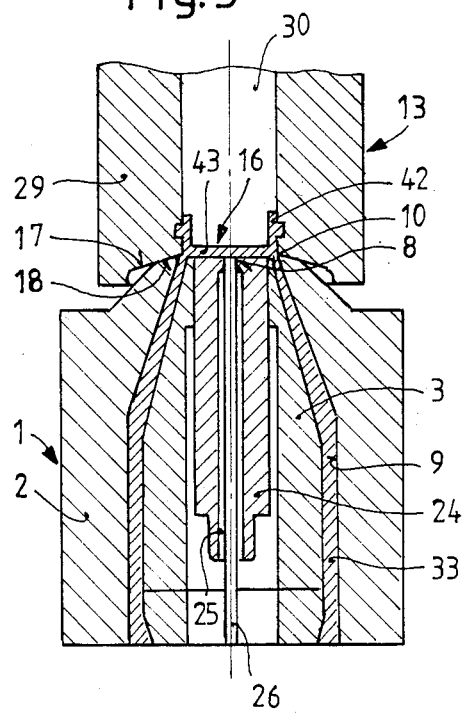
FIG. 5 is a vertical cross sectional view of essential parts of a third inventive apparatus for manufacturing a hollow body comprised of thermoplastic plastic material, which hollow body is open on one end and closed on the other, said apparatus being in a first operating position.

The apparatus of FIGS. 5–7 has a structure largely similar to that of FIGS. 2–4; accordingly the same reference numerals are used. The apparatus of FIG. 5 differs in the configuration of the head piece 34, as will be described, with regard to the exterior shape and with regard to the method of manufacturing. The head piece 34 according to this embodiment has the shape of a flat-bottomed pan; accordingly the recess 16 is comprised of a ring-like (cylindrical) space 42 and a disc-like space 43. To produce this configuration, the plunger 30 extends markedly into the recess 16 of the mold block 29. This advance (downward) of the plunger is greater in FIG. 6 than in FIG. 5, so that the disc-like space 43 of FIG. 6 is thinner than in FIG. 5. The compressive movement of plunger 30 is exerted on the head piece 34 when piece 34 has partially cooled, in order to produce a membrane-like disc structure (which is unattainable by injection molding alone).

The apparatus of FIGS. 8–10 has a structure largely similar to that of FIGS. 2–4; accordingly the same reference numerals are used. The apparatus of FIGS. 8–10 differs in that the withdrawal device 13 does not have a plunger 30. Also (FIGS. 8–9), the injection molding of the head piece 34 and the withdrawal (extrusion and stretching) of the tubular segment 35 are carried out at the same radially measured, ring width of the nozzle opening 10, i.e. with the cone piece 3 not advanced (upward). In addition, there are the following differences in the configuration of the blowing means and in the recess 16 of the withdrawal device 13:

The recess 16 has the shape of an elongated nipple. Its cross section decreases with progression upward (in the withdrawal direction), it has fin-like lateral spaces 44, and near its end facing the ring-shaped nozzle it has a region of decreased cross section 45, extending around its circumference. According to FIG. 8, an elongated, thin molding extension 46, projects into this recess 16, with a cross section which decreases with progression in the withdrawal direction (upward). The resulting head piece, as seen from FIG. 8, has the shape of a nipple-like hollow cap with lateral fins, and on its end facing the body part of the hollow body it has a closed-ring-shaped region 45 of abruptly reduced wall thickness, which region extends around the circumference of the head piece.

The molding extension 46 is borne at the upper end of an elongated sliding piece 47 which serves to close off the blow opening 8 (FIG. 8). The blow air is supplied through an axial bore 48 in the sliding piece 47, which bore opens out laterally in a region near the sealing region of piece 47 which is employed for the closing function of opening 8. The lateral openings of bore 48 are themselves blocked off by the side of the blow opening 8 (FIG. 8). At a distance from this sealing side region of opening 8 is a chamber 49 in the cone piece, through which chamber the sliding piece 47 also passes. The chamber 49 is sealed off below by a ridge which accommodates the sliding piece 47 and allows piece 47 to slide but forms a seal around it. When piece 47 is retracted and the blow opening 8 is open, air is blown from the lateral openings of bore 48 into chamber 49 from where it passes to blow opening 8. This configuration of the blow means is applicable in all cases, and is generally provided i.e. essential when one is fabricating a head piece with the aid of a molding extension as described supra.

Figure 11:
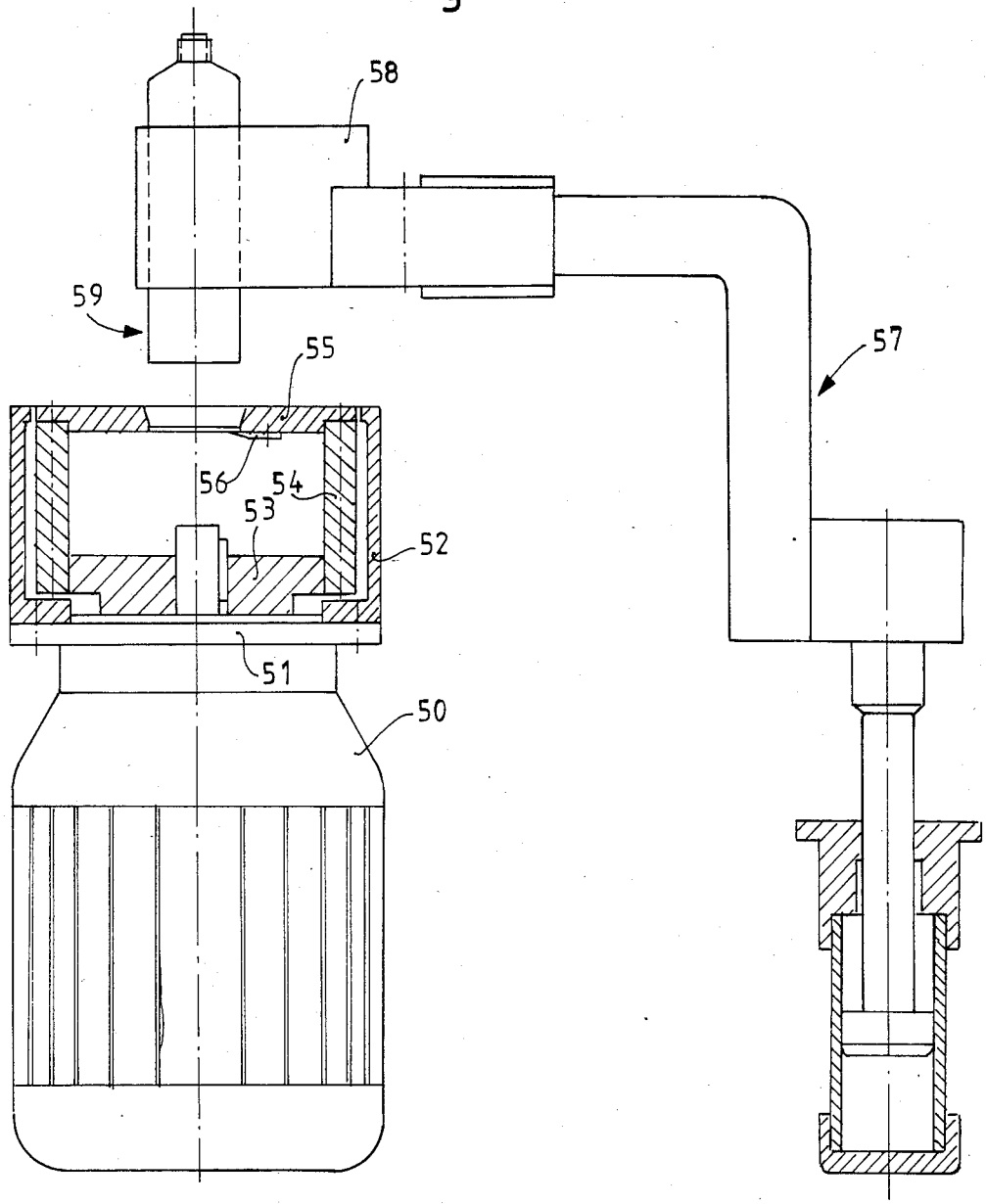
FIG. 11 shows a cutting device for use with the apparatus according to FIG. 1.

The cutting device according to FIG. 11 comprises a motor 50 which bears a plate 51 on its housing, which plate has a circumferential protective wall 52. The motor shaft drives a disc 53 on which posts 54 are mounted which support a cover 55. Cover 55 has a central opening and is provided with a knife element 56 which extends into said opening. A manipulating device 57 with gripping means 58 extracts the fabricated hollow body 59 from the opened blow mold, brings it to a point above the cutting device, and lowers the lower end of the hollow body through the opening in cover 55. The severed lower end region flies away through the space between the posts 54.

We claim:

1. An apparatus for manufacturing a hollow body comprised of thermoplastic material, which hollow body is open on one end and closed on the other, has a head piece fabricated by injection molding, has a body part comprised of a tubular segment integrally joined to said head piece, and has a bottom member, wherewith the subject apparatus is comprised of a ring-shaped nozzle wherein a nozzle cone piece and a nozzle piece define a ring-shaped nozzle opening, which opening can be closed with severance of the plastic, said apparatus being further comprised of a withdrawal device with a recess for forming the head piece, which withdrawal device is axially reciprocally movable with respect to the ring-shaped nozzle, said apparatus further comprised of a blow mold having a plurality of blow-mold pieces which are laterally reciprocally movable, said apparatus further comprised of bottom elements of the blow-mold pieces, disposed at the altitude of the ring-shaped nozzle, which bottom elements rest on the ring-shaped nozzle when the blow-mold pieces are in the assembled position, and said apparatus comprised of blow means for blowing air into the tubular segment; characterized in that the withdrawal device is configured for forming a head piece which is closed to the exterior; in that the bottom elements of the blow mold which rest on the ring-shaped nozzle form a perforation in the bottom member of the body part of the hollow body, which perforation extends over the region surrounded by the ring-shaped nozzle opening; and in that the blow means disposed in the ring-shaped nozzle is associated with the perforation in the bottom member of the body part.

2. An appartus according to claim 1 wherein the apparatus includes a subsequent cutting device for removing an edge strip surrounding the perforation in the bottom member.

3. An apparatus according to claim 1 wherein when the withdrawal device rests on the ring-shaped nozzle, a blow opening in the nozzle cone piece, which opening is part of the blow means, is closed off by a rod or the like which is reciprocally movable in the cone piece.

4. An apparatus according to claim 1 wherein the bottom elements of the blow-mold pieces which elements rest on the ring-shaped nozzle press the edge region bordering the perforation in the bottom member of the hollow body against an end portion of the cone piece which end portion has been moved out of the nozzle opening.

5. An apparatus according to claim 1 wherein an elongated sliding piece which is axially reciprocally slidable has a molding extension which extends into the recess of the withdrawal device when the withdrawal device rests on the ring-shaped nozzle; characterized in that the extension is itself elongated and thin, and said extension together with the said recess bounds a cavity for molding a nipple-shaped head piece.

6. An apparatus according to claim 5 wherein the nipple-shaped head piece has a region of reduced cross section extending around its circumference, near the end of the recess.

7. An apparatus according to claim 1 wherein the recess on the withdrawal device has a cylinder-shaped radially outer space on its side directed away from the ring-shaped nozzle, and has a disc-shaped transverse space on its side facing the ring-shaped nozzle.

8. An apparatus according to claim 1 wherein the boundary of the recess of the withdrawal device on the side directed toward the ring-shaped nozzle is determined by an axially reciprocally movable elongated sliding piece, wherewith when the withdrawal device is resting on the ring-shaped nozzle the said sliding piece can be moved toward and against the withdrawal device after the injection molding of the head piece.

9. An apparatus according to claim 8 wherein the elongated sliding piece has an axial bore for supplying blow air, which bore has a lateral opening or openings, wherewith, when the piece is retracted, said opening or openings are disposed in a chamber of the cone piece, which chamber communicates with the open blow opening.

* * * * *